United States Patent [19]

Decaprio et al.

[11] 3,755,251

[45] Aug. 28, 1973

[54] MANUFACTURE OF POLYETHYLENE TEREPHTHALATE POLYESTER

[75] Inventors: Joseph Donald Decaprio, Hopewell; Brian Armstead Dementi, Richmond; Stanley David Lazarus, Petersburgh, all of Va.

[73] Assignee: Allied Chemical Corporation, New York, N.Y.

[22] Filed: Feb. 28, 1972

[21] Appl. No.: 230,085

[52] U.S. Cl... 260/45.95 R, 260/49.95 H, 260/75 C
[51] Int. Cl....................... C08g 17/08, C08g 51/58
[58] Field of Search.............. 260/45.95 R, 45.95 H, 260/75 H, 75 R, 75 C

[56] References Cited
UNITED STATES PATENTS

| | | | |
|---|---|---|---|
| 2,621,168 | 12/1952 | Ross et al. | 260/75 |
| 3,321,437 | 5/1967 | Goodman et al. | 260/75 |
| 2,998,408 | 8/1961 | Zoetbrood | 260/75 |
| 3,374,202 | 3/1968 | Schwarcz | 260/75 |
| 3,446,766 | 5/1969 | Taylor | 260/45.75 |
| 3,594,347 | 7/1971 | Lazarus et al. | 260/45.75 |
| 2,705,227 | 3/1955 | Stamatoff | 260/45.75 |
| 3,023,192 | 2/1962 | Shivers | 260/45.95 |
| 2,437,232 | 3/1948 | Rothrock et al. | 260/75 |
| 3,341,492 | 9/1967 | Champ et al. | 260/45.95 |
| 3,312,657 | 4/1967 | Lund et al. | 260/45.95 |
| 2,972,600 | 2/1961 | Braidwood | 260/45.95 |
| 3,600,448 | 8/1971 | Robinson | 260/45.95 |

*Primary Examiner*—Donald E. Czaja
*Assistant Examiner*—V. P. Hoke
*Attorney*—Luther A. Marsh et al.

[57] ABSTRACT

The manufacture of linear high-molecular weight film and fiber-forming polyester wherein the reaction of polycarboxylic acid with a polyol takes place in the presence of a catalytic amount of a halogenated phenolic compound to improve processing and end product characteristics.

9 Claims, No Drawings

MANUFACTURE OF POLYETHYLENE TEREPHTHALATE POLYESTER

BACKGROUND OF THE INVENTION

1. Field of the Invention

This invention relates to a process for preparing linear high-molecular weight polyethylene terephthalate polyesters. More particularly, it relates to an improved polyester product and process for directly preparing polyester pre-polymer in the presence of a halogenated phenolic compound which can then be polycondensed into high molecular weight and high quality linear polyester suitable for further processing into shaped articles such as fibers and films useful in preparing textile and industrial articles of commerce.

2. Description of the Prior Art

It is conventional to prepare linear high-molecular weight polyesters on a commercial scale either by the ester interchange reaction between dimethyl terephthalate and a polyol, or by a direct esterification process first disclosed by Whinfield and Dickson in 1941 and illustrated in U. S. Pat. No. 2,465,310. This initial direct esterification process was not entirely satisfactory as lenghty refluxing of the acid and glycol was necessary to obtain a solution. Many improvements have been made upon the Whinfield and Dickson process, some of which are illustrated in U. S. Pat. Nos. 3,050,533; 3,427,287, and 3,484,410. And, although many improvements have been made in the direct esterification route for preparing linear high-molecular weight polyesters to the extent that some commercial use is now made of this process, many problems still exist in the processing of the polyester as well as obtaining the necessary physical properties of the finished polyester for certain end uses. Another improvement is disclosed by Taylor in U. S. Pat. No. 3,446,766 granted May 27, 1969. This patent discloses a process for preparing improved polyester fibers having very low concentrations of free-carboxyl-group contents by adding a copper salt of an organic carboxylic acid and a molar excess of alkali metal iodide to a fully polymerized molten polyester prior to melt spinning. Such polyester having low free-carboxyl-group contents gives superior performance when used in articles where heat degradation is a problem. Another known necessary improvement to yield superior performance when used in commercial articles where heat degradation is a problem includes suppressing undesirable side reactions such as ether linkages, as such linkages affect a reduction of the polymeric polyester's softening point, light resistance, heat resistance, oxidation resistance and, when the polymer is shaped into yarn and dyed, its dye light fastness. In short, excess ether groups in the final polymeric polyester make such unsatisfactory for use in textile end uses such as filaments and fibers as well as in films. Other problems are observed in the direct esterification reaction as when the reaction is carried out too slowly thus allowing these side linkages to increase. Therefore, it is indeed helpful to catalyze the reaction to control the processing time in order to control the product quality; however, when the same compound utilized as a catalyst serves multiple purposes of improving the end product then a true contribution is made.

SUMMARY OF THE INVENTION

The present invention provides an efficient and convenient method for more readily preparing polyester shaped structures which are useful in many textile and industrial applications in a greatly shortened period of time having highly improved end product characteristics. Furthermore, the invention provides polyester fibers which have excellent resistance when embodied in articles where heat degradation is a problem. Further, an important advantage is the usefulness of one additive that not only yields improved characteristics to the finished polymeric polyester but also acts as a catalyst during the direct esterification reaction wherein the improved product is prepared.

A prime object of this invention is to provide new and useful linear, high-molecular weight polyesters having valuable properties, including that of being capable of being formed into useful items of commerce such as filaments, fibers and films.

Another object of this invention is a catalytic process for the esterification of aromatic dicarboxylic acid with polyol under direct esterification conditions.

A further object of this invention is to provide an additive for the direct esterification reaction of an aromatic dicarboxylic acid with a polyol which improves the end product characteristics of the polyester.

A still further object of this invention is to provide an additive of a halogenated phenolic compound for the direct esterification reaction of an aromatic dicarboxylic acid with a polyol which acts both as a catalyst in said reaction and yields improved end product characteristics to the polymeric polyethylene terephthalate polyester. Other objects will become apparent in the course of the following detailed description.

In accordance with the above objects, it has now been discovered that rapid reaction rates in the preparation of polyester by the direct esterification route can be obtained while at the same time improving the end product characteristics of the polyester. Accordingly, the present invention is the preparation of a linear high-molecular weight film and fiber polyester and copolyesters by reacting an aromatic dicarboxylic acid with a polyol containing two to about 10 carbon atoms per molecule under direct esterification conditions in the presence of a compound selected from the group consisting of 2,4,6-triiodophenol, 2,4,6-triiodo-m-cresol, and tetrabromocatechol in an amount sufficient to catalyze said reaction and to improve the end product characteristics of said polyester.

The direct esterification of the aromatic dicarboxylic acid and the polyol can start at a temperature as low as 200°C. and range up to 300°C., and at atmospheric and superatmospheric pressures ranging up to 500 psig. The direct esterification reaction is carried out in the absence of oxygen-containing gas. More preferably, the reaction temperature ranges from about 230°C. to about 280°C. and at a pressure, when superatmospheric pressure is employed, ranging from about 50 to about 250 psig. The actual reaction times will vary depending upon the reaction temperature and pressure. The amount of polyol is reacted with the aromatic dicarboxylic acid in an amount ranging from about 1 to about 3 moles of polyol per mole of acid. The amount of the halogenated phenolic compound present during the direct esterification reaction ranges generally from about 0.005 to about 0.100 weight percent based on the weight of the glycol; and it can be a mixture of the compounds enunciated in the teaching examples. The halogenated phenolic compound or mixture thereof can be added prior to or during the direct esterification reaction.

Various other additives may be added before, during, or after direct esterification reaction in order to further control or tailor the reactions in order to obtain required characteristics of the final polymer for specific end uses. As, for example, if fatigue resistance is desirable, a small amount of diphenylene phenylene diamine can be added. Additives can also be added to control such characteristics of the finished polymer as heat and light stability, dye uptake, adhesion, static dissipation, luster, flammability, dyestuff precursors and assistants, low free-carboxyl content, brighteners, fluorescent agents, ether formation suppressants and the like.

The condensation of polymerization of the material obtained by the direct esterification reaction between aromatic dicarboxylic acid with a polyol is usually carried out at a reduced pressure which can be as low as 0.1 torr and a temperature in the range of from about 260°C. to about 300°C. This part of the reaction is carried out under these conditions for periods of about 1.0 to about 10 hours, and preferably from about 2 to about 6 hours until a polymerized polyester product of the required molecular weight as determined by viscosity or other convenient physical measurement is obtained. The duration of such periods depends upon many factors such as the polymerization conditions set up for the process, pressure and temperature profiles, surface generation conditions, ingredient mole ratios, catalyst concentration, additives utilized, requisite viscosity, etc. Any excess glycol and other by-products are removed more easily by utilizing continuous agitation of the mass while simultaneously exposing said mass to a predetermined vacuum.

The catalyst and end-product characteristic improver that can be utilized in carrying out the objectives of this invention are the halogenated phenolic compounds or mixtures thereof. The iodo substituted compound is preferred with the 2,4,6-triiodophenol compound being most preferred. Surprisingly, it has now been found that a halogenated phenolic compound or mixture thereof yields a catalytic effect to the direct esterification process wherein an aromatic dicarboxylic acid is reacted with a polyol as well as an improved end product characteristic effect to a fiber and film polyester made by such process.

Many test are utilized for the evaluation of thermal or heat stability of cords for reinforcing rubber articles. One such test, commonly referred to as the heat stability test, measures the percentage strength retention of tire cord which has been subjected to an elevated temperature in a hermetically sealed glass tube and essentially consists of taking a 2.0-gram sample of the cord to be tested and subjecting said cord to moisture equilibrium at 55 percent relative humidity and 75°F., then sealing it into an approximately 29 cm.$^3$ glass tube and heating to a temperature of 300°F. for 48 hours after which the residual tensile strength of the cord is determined and its percentage strength retention calculated relative to an untreated control sample of the same material and the same weight. Each sample is tested five times and a statistical average of the percentage strength retention of the tire cord is taken based upon the initial strength of the cord as 100 percent.

The following examples are illustrative of various embodiments of the present invention but are not construed as limiting the invention in any way. The parts of ingredients are expressed as stated in the examples.

EXAMPLE I

Five hundred milliliters of ethylene glycol was placed in a 1000 milliliter flask equipped with a thermometer, magnetic stirrer, and heating mantle. The ehtylene glycol was heated to 191°C., then 6.8 grams of terephthalic acid was added with stirring. Upon complete dissolution of the terephthalic acid, the first of a series of four 10-milliliter samples were taken for carboxyl analysis. The temperature remained constant during the sampling.

| Sample No. | Time, Hours | Milliliters of KOH (0.1041 N) Used to Reach End Point |
|---|---|---|
| 1 | 3.998 | 5.30 |
| 2 | 4.498 | 4.90 |
| 3 | 4.999 | 4.45 |
| 4 | 5.499 | 4.10 |

To follow the rate of esterification, the carboxyl versus time (hours) data were plotted, and the rate constant was determined from the slope. The rate constant was found to 0.254 hr.$^{-1}$ or 0.254/hour.

EXAMPLE II

Five hundred milliliters of ethylene glycol was placed in a 1000 milliliter flask equipped with a thermometer, magnetic stirrer, and heating mantle. The ethylene glycol was heated to 191°C. and 0.5014 gram, 0.087 percent based on weight of glycol of 2,4,6-triiodophenol was added. This dissolved immediately. Then 6.8025 grams of terephthalic acid was added with stirring. Upon complete dissolution of the terephthalic acid, the first of five 10-ml. samples was taken for carboxyl analysis. Sample number one was taken at zero reading on the timer. The temperature remained constant during the sampling.

| Sample No. | Time, Hours | Milliliters of KOH (0.0933 N) Used to Reach End Point |
|---|---|---|
| 1 | 0 | 13.98 |
| 2 | 0.310 | 5.85 |
| 3 | 0.794 | 1.65 |
| 4 | 1.782 | 0.35 |
| 5 | 2.802 | 0.32 |

To follow the rate of esterification, the carboxyl versus time (hours) data were plotted, and the rate constant was found to be 2.672 hrs.$^{-1}$.

EXAMPLE III

The same procedure was used as in Example II except the concentration of 2,4,6-triiodophenol was 0.044 percent based on weight of glycol, and the rate constant was 2.076 hrs.$^{-1}$.

EXAMPLES IV THROUGH X

The same procedure was used as in Example II. The additives used, concentration and rate constant are listed below:

| Compound | Concentration, Percent | Rate Constant, Hrs.$^{-1}$ |
|---|---|---|
| 2,4,6-Triiodophenol | 0.009 | 0.875 |
| 2,4,6-Triiodo-m-cresol | 0.009 | 0.693 |
| 4-Iodophenol | 0.013 | 0.470 |
| Tetrabromocatechol | 0.008 | 1.223 |
| 2,4,6-Triiodoresorcinal | 0.0094 | 1.010 |

EXAMPLE XI

1800 Grams terephthalic acid, 1345 grams ethylene glycol, 1.5 grams antimony triacetate, 5.4 grams of diisopropyl amine and 1.3 grams of 2,4,6-triiodoresorcinol are charged to an electrically heated 1-gallon autoclave equipped with double spiral agitator, condenser and bottom discharge port. The reactor is sealed, purged with nitrogen and pressured to 60 psig with nitrogen. The agitator is started and adjusted to 12 rpm. The temperature controller is set for 270°C. internal temperature. Any excess pressure build-up over 75 psig is bled off through the condenser. Two hours after the start of the batch, the internal temperature is at 210°C. and distillate starts to leave the condenser. In the next 15 minutes, 79 cc. of condensate is collected. A total of 921 cc. of condensate is collected in 90 minutes. At this point the pressure is released over a 30-minute period and the internal temperature adjusted to 280°C. A vacuum pump is then attached to the reactor and the polymerization is continued for 150 minutes under reduced pressure (0.1 Torr). At the end of the polymerization cycle, nitrogen is admitted into the reactor and the polymer is extruded through the bottom port into a water quence trough from where the coagulated strand is fed through a pelletizing machine (Wiley Mill). The polyester is then dried for 16 hours at 135°C. and 0.5 Torr in a vacuum oven. Analysis of this polymer shows intrinsic viscosity 0.88, carboxyl end groups equal 24.6 equivalent per $10^6$ grams. This polymer is spun through a 1-inch extruder, drawn and combined to make 1300 denier, 192 filament yarn.

EXAMPLE XII

A control polymer is made by the same procedure as in Example XI except no triiodoresorcinol is charged. Distillate starts to collect after 2.5 hours at which time the temperature of the batch is 220°C. In the next 15 minutes, 62 cc. of distillate are collected (compared to 79 cc. for Example IX) and a total of 916 cc. is collected in 2 hours (compared to 921 cc. in 90 minutes for Example IX). The polymer is dried and analyzed and found to have intrinsic viscosity 0.90 and carboxyl end group content of 29.1 eq./$10^6$ grams. This polymer is also spun and drawn into 1300 denier, 192 filament yarn.

The yarn samples of Examples IX and X are tested for thermal stability by means of the previously described stability test.

It is found that the yarn made from polymer containing 2,4,6-triiodophenol retains 85.7 percent of its original strength after exposure to heat while the control yarn retains only 79.5 percent of its original strength.

What is claimed is:

1. A process for the direct esterification of terephthalic acid with an alkylene glycol which comprises esterifying terephthalic acid with an alkylene glycol containing 2 to about 10 carbon atoms per molecule under direct esterification conditions wherein the glycol and acid are reacted in the presence of about 0.005 to about 0.100 weight percent based on the glycol, of a halogenated phenol employed as a catalyst therefor, selected from the group consisting of 4-iodophenol, 2,4,6-triiodophenol, 2,4,6-triiodo-m-cresol, tetrabromocatechol and 2,4,6-triidoresorcinol.

2. The process of claim 1 wherein the direct esterification is conducted at temperatures ranging from about 200°C. to about 300°C. and pressures ranging from atmospheric up to about 300 psig.

3. The process of claim 1 wherein the reaction is carried out in the presence of 2,4,6-triiodophenol.

4. The process of claim 1 wherein the reaction is carried out in the presence of 2,4,6-triiodo-m-cresol.

5. The process of claim 1 wherein the reaction is carried out in the presence of tetrabromocatechol.

6. The process of claim 1 wherein the alkylene glycol is ethylene glycol.

7. The process of claim 6 wherein the molar ratio of said acid to said glycol is 1.0:1.0–2.0.

8. The process of claim 6 wherein the molar ratio of said acid to said glycol is 1.0:1.1–1.6.

9. A stable polyethylene terephthalate polyester product made by the process of claim 1 in the form of filaments and fibers in which the intrinsic viscosity of the polymer is at least 0.75 deciliter per gram and contains said catalytic halogenated phenol subsequent to the esterification reaction as a stabilizer.

* * * * *